Figure 1:
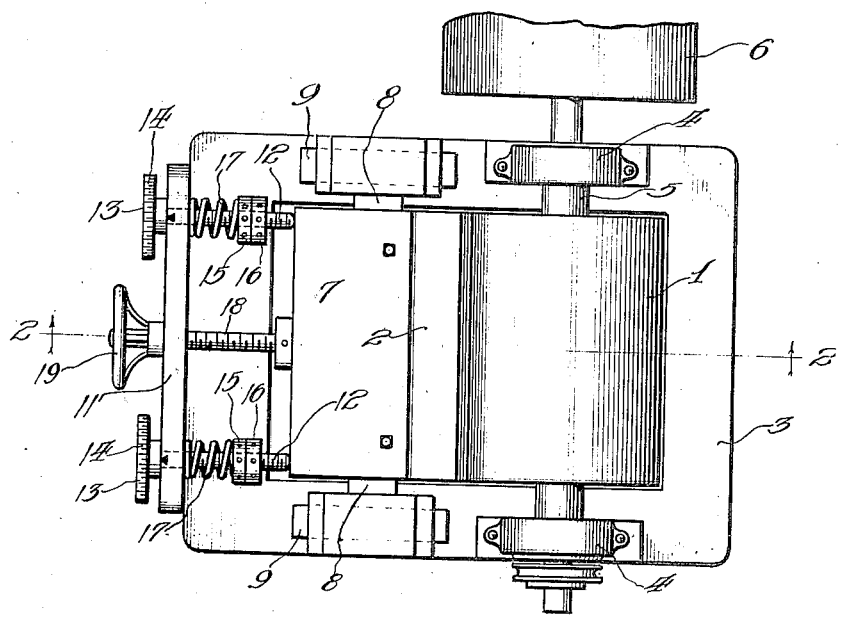

July 24, 1923.

W. G. ANDREWS 1,462,730

MACHINE AND PROCESS FOR REMILLING FINISHED FLOUR TO BLEACH SAME AND OPEN STARCH CELLS

Filed Nov. 19, 1920

Witness:
Stephen S. Rebora

Inventor
Wm. G. Andrews,
by Chamberlin & Freudenreich
Attys.

Patented July 24, 1923.

1,462,730

UNITED STATES PATENT OFFICE.

WILLIAM G. ANDREWS, OF CHICAGO, ILLINOIS.

MACHINE AND PROCESS FOR REMILLING FINISHED FLOUR TO BLEACH SAME AND OPEN STARCH CELLS.

Application filed November 19, 1920. Serial No. 425,070.

*To all whom it may concern:*

Be it known that I, WILLIAM G. ANDREWS, a citizen of the United States, residing at Chicago, county of Cook, State of Illinois, have invented a certain new and useful Improvement in Machines and Processes for Remilling Finished Flour to Bleach Same and Open Starch Cells, and declare the following to be a full, clear, and exact description of the same, such as will enable others skilled in the art to which it pertains to make and use the same, reference being had to the accompanying drawings, which form a part of this specification.

It is well known that if the starch cells of flour are partially ruptured or a portion of the cells of the flour are ruptured, the capacity of the flour for absorbing and retaining moisture is increased and the quality of the bread or other product made therefrom is improved and such product will retain its freshness longer than those made of ordinary flour. Various processes for opening the starch cells of flour have been adopted or suggested, these processes often requiring the injection of steam which, in conjunction with heat, discolors the flour.

The object of the present invention is to produce a simple and novel machine adapted to be used in remilling commercially finished flour so as to open the starch cells therein without injury to the color but, in fact, improving the same.

My invention has as its principal feature the employment of two relatively-movable co-operating stones between which the finished flour is passed, the stones having peculiar characteristics which will bring about a rubbing of the flour particles and what I believe to be a rupturing of starch cells in the flour, while inducing a circulation of air which effects a bleaching of the flour. The theory that I have as to the bleaching is that it is due to the ozone set free or generated during the rubbing operation but, whatever the reason is, the result is to bleach. The stones must be of such materials that they will take and keep a polish and at the same time present porous working faces differing from each other in the two stones. In other words, the two stones, although having pores in their working faces, are or become polished instead of being "dressed" as in the old days of the burr stones. One of the stones is preferably of a material of medium hardness and of a non-flinty character and it is preferably close grained,—that is, its pores are preferably small so as to provide a comparatively smooth working surface; Esopus stone being a good example of this class of stone. The other stone is of a softer more porous variety such as that known as Holland or Cologne blue stone or a stone of similar nature: providing a working face full of comparatively large pores. Both stones, however, must be of a kind which will not yield dust and grit when the machine is in operation. Other features of my invention have to do with the supporting of the two stones in co-operative relation so as to permit of accurate adjustment to secure the best results under all conditions.

Figure 2:
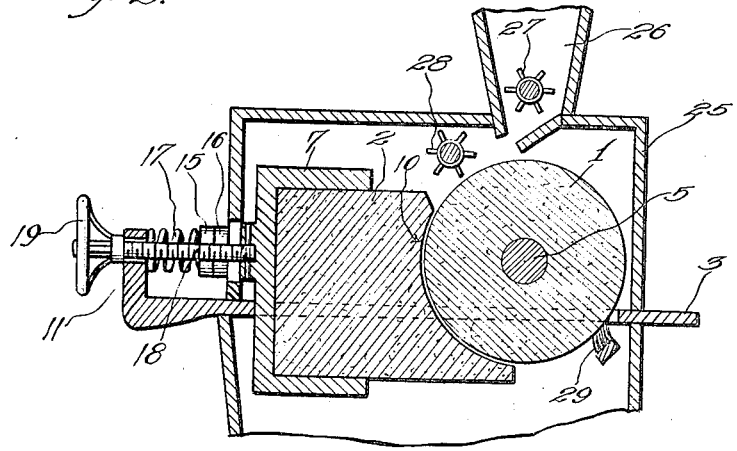

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of a machine arranged in accordance with my invention, the housing being removed; and Fig. 2 is a section taken approximately on line 2—2 of Fig. 1, a housing being conventionally illustrated.

Referring to the drawing, 1 represents a rotary roll of stone and 2 a concave stone shoe. One of these members, preferably the roll, is made of the medium, hard material having comparatively small pores, as aforesaid, while the other, preferably the shoe, is made of the softer, more porous stone. The roll lies above and projects down into the open center of a suitable supporting table, 3, carrying suitable bearings, 4, preferably the roller bearing type, in which the shaft, 5, of the roll is journalled. The roll is driven in any suitable manner as, for example, from a pulley, 6. The shoe is mounted in a suitable cast iron box, 7, provided with projections, 8, slidably mounted on stationary guides, 9, supported on the table or frame, 3, at right angles to the shaft 5. It will therefore be seen that the member 2 may be moved bodily from and toward the roll so as to vary the distance between its smooth concave working face, 10, and the smooth surface of the roll.

The table, 3, has an upwardly-projecting flange, 11, behind and at some distance from the member 7. Through this flange loosely extend a pair of screws or threaded rods, 12, the inner ends of which rest against the rear side of the box at opposite ends thereof. Screw threaded on the outer end of each screw or rod, 12, is a hand-wheel, 13, which abuts against the outer face of the flange 11 and is provided with suitable graduations, 14, by means of which both rods may be adjusted in accurate relation to each other. On the inner end of each member 12 are a nut, 15, and a lock nut, 16. Between each pair of nuts and the inner face of the flange 11 is a strong spring, 17. It will be seen that the springs tend to draw the screws or rods, 12, inwardly so as to force the member 2 toward the roll. When the hand-wheels are turned in one direction the springs are left free to act to move the shoe toward the roll; but when the hand-wheels are turned in the opposite direction the springs are compressed and the shoe is free to move away from the roll. The springs are made strong enough so that when the machine has been adjusted for a particular kind of work, the screws or rods act in the same way as stationary stops; but in case some foreign object, of a size too large to pass between the roll and the shoe, as adjusted, should drop into the machine, the spring will permit the shoe to be pressed back and avoid breaking the machine. The shoe may be drawn away from the roll by a rod, 18, connected at one end to the supporting casting 7 for the shoe and passing loosely through the flange 11. A hand-wheel, 19, is screw threaded on the outer end of the rod, 18, and, when it is turned in one direction, draws the shoe away from the roll against the tension of the springs 17.

I have found that where the stone roll is about fourteen inches long and twelve inches in diameter, the best results are produced with a shoe having a working face about eight inches long in the direction of the circumference of the roll, but I do not wish to be limited to any particular proportions. A roll of this size should run at a speed of from five hundred revolutions a minute to seven hundred revolutions a minute.

The flour may be fed to the machine in any usual or suitable way. Thus, as conventionally shown in Fig. 2, the roll and its co-operating shoe may be arranged within a housing, 25, having at the top a suitable hopper, 26, which discharges its contents on the surface of the roll which is just about to pass into operative relation to the working face of the shoe. In the hopper there may be a suitable agitator, 27, and just above the point of admission of the material between the roll and the shoe may be another suitable stirrer or agitator, 28, which will insure against clogging of the material at this point.

A brush, 29, may be placed on the under side of the roll for the purpose of brushing therefrom material which may adhere thereto.

While I have illustrated and described with particularity only a single preferred form of my invention I do not desire to be limited to the exact structural details thus illustrated and described; but intend to cover all forms and arrangements which come within the terms employed in the definitions of my invention constituting the appended claims.

I desire to have it further understood that while I have formulated a theory as to what happens in carrying out my improved process in the operation of my improved machine, I of course cannot be certain as to this, but I am certain that the results produced by the process are such that the flour is whiter than before being treated and possesses the capacity for absorbing and retaining more moisture than untreated flour and the capacity for causing the bread or other product made therefrom to be of improved quality and to be capable of retaining its freshness longer than when made of ordinary flour.

I claim:

1. A machine for remilling finished flour comprising two relatively movable members arranged adjacent to each other and made of stones each of uniform hardness throughout but differing from the other in degree of hardness, one of said stones having large pores and the other having small pores, and both of said stones being smooth and being capable of taking a polish at the points of contact with each other.

2. A machine for remilling finished flour comprising two relatively movable members of stone each having smooth polished co-operating working faces, one of said stones being of medium hardness and non-flinty, and the other stone being softer and having large pores.

3. A machine for remilling finished flour comprising a roll and a co-operating concave shoe, the roll being of smooth polished stone of medium hardness and non-flinty character, and the shoe being of smooth softer stone containing larger pores and having its concave working face polished.

4. A machine for remilling finished flour comprising a roll member and a co-operating concave shoe member both made of smooth porous stones which will take a polish, one of said members being made of stone of medium hardness and small pores, and the other member being made of softer stone having large pores.

5. The method of remilling flour which consists in passing it in the dry state between smooth relatively-moving surfaces of different porosity whereby the flour is subjected to a maximum rubbing and a minimum grinding action.

6. The method of remilling flour which consists in passing it between smooth stones differing from each other in porosity and movable relatively to each other in such a manner as to subject the flour to a maximum rubbing and a minimum grinding action.

7. The method of remilling flour which consists in passing it in the dry state between a polished roll member and a co-operating polished concave shoe member, one of said members being of stone of medium hardness and non-flinty character and the other of said members being of softer stone containing larger pores.

8. The method of remilling flour which consists in passing it in the dry state between a roll member and a co-operating concave shoe member, both of said members being made of stones each of uniform hardness throughout but differing from the other in degrees of hardness and differing also from the other in degree of porosity, and both of said stones having smooth working faces.

In testimony whereof, I sign this specification.

WILLIAM G. ANDREWS.